United States Patent
Szewczyk et al.

(10) Patent No.: US 9,718,427 B2
(45) Date of Patent: Aug. 1, 2017

(54) LATCH DEVICE AND ANCHOR WITH SWIVEL COUPLING

(71) Applicant: Shield Restraint Systems, Inc., Elkhart, IN (US)

(72) Inventors: Alexander J. Szewczyk, Elkhart, IN (US); Brandon Marriott, Goshen, IN (US); David D. Merrick, Rochester, IN (US)

(73) Assignee: Shield Restraint Sytems, Inc., Elkhart, IN (US)

( * ) Notice: Subject to any disclaimer, the term of this patent is extended or adjusted under 35 U.S.C. 154(b) by 404 days.

(21) Appl. No.: 14/172,660

(22) Filed: Feb. 4, 2014

(65) Prior Publication Data

US 2015/0021926 A1   Jan. 22, 2015

Related U.S. Application Data

(60) Provisional application No. 61/856,640, filed on Jul. 19, 2013.

(51) Int. Cl.
   *B60R 21/06* (2006.01)
   *B60J 5/04* (2006.01)
   (Continued)

(52) U.S. Cl.
   CPC ............ *B60R 21/06* (2013.01); *B60J 5/0487* (2013.01); *E05B 85/00* (2013.01); *E05B 85/04* (2013.01);
   (Continued)

(58) Field of Classification Search
   CPC ... B60R 21/06; B60R 2021/028; E05B 85/00; E05B 85/04; E05B 2063/0026;
   (Continued)

(56) References Cited

U.S. PATENT DOCUMENTS 805,674 A   11/1905   Senderling
820,383 A    5/1906   Ashland
             (Continued)

FOREIGN PATENT DOCUMENTS

CA   2450995 A1    2/2003
CA   2522705 A1   11/2004
             (Continued)

OTHER PUBLICATIONS

U.S. Appl. No. 60/307,899, filed Jul. 26, 2001, Woodward.
(Continued)

*Primary Examiner* — Andrew Roersma
(74) *Attorney, Agent, or Firm* — Perkins Coie LLP

(57) ABSTRACT

Latch systems having latch devices for releasably engaging anchors are disclosed herein. A latch system configured in accordance with one embodiment of the disclosure includes a latch device having an anchor aperture configured to receive a head portion of an anchor. The latch device includes a first engagement member operably coupled to an actuator. The first engagement member can restrain the head portion between the anchor aperture and a second engagement member, and the second engagement member can urge the head portion against the first engagement member. In operation, a user can move the actuator from a first position to a second actuator position to move the first engagement member away from the head portion and release the latch device from the anchor.

24 Claims, 11 Drawing Sheets

(51) Int. Cl.
  *E05B 85/00*  (2014.01)
  *E05B 85/04*  (2014.01)
  *B60R 21/02*  (2006.01)
  *E05B 63/00*  (2006.01)

(52) U.S. Cl.
  CPC . *B60R 2021/028* (2013.01); *E05B 2063/0026* (2013.01); *Y10T 292/08* (2015.04)

(58) Field of Classification Search
  CPC .. E05B 15/006; E05B 17/2011; E05B 53/006; E05B 63/121; E05B 15/04; E05B 14/101; E05B 17/0037; E05B 63/20; E05B 63/2025; Y10T 292/08; Y10T 24/4084; Y10T 24/44581; Y10T 24/45602; Y10T 24/4736; Y10T 24/4745; E05C 19/009; E05C 19/04; E05C 1/085
  USPC .......................... 292/252, 137, 138, 163, 175
  See application file for complete search history.

(56) References Cited

U.S. PATENT DOCUMENTS

| | | |
|---|---|---|
| 867,162 A | 9/1907 | Seidl |
| 940,917 A | 11/1909 | Asquith |
| 1,171,380 A | 2/1916 | Arthur |
| 1,299,821 A | 4/1919 | Carpmill et al. |
| 1,397,237 A | 11/1921 | Schenk |
| 2,124,276 A | 7/1938 | Steigenberger |
| 2,240,400 A * | 4/1941 | Johnson ................ E05B 17/007 292/2 |
| 2,393,551 A | 1/1946 | Morin |
| 2,398,947 A | 4/1946 | Marinsky |
| 2,549,841 A | 4/1951 | Morrow et al. |
| 2,763,451 A | 9/1956 | Moran |
| 2,856,663 A | 10/1958 | Elsner |
| 2,938,254 A | 5/1960 | Gaylord |
| 3,013,517 A | 12/1961 | Isham |
| 3,128,520 A | 4/1964 | Carter et al. |
| 3,414,947 A | 12/1968 | Holmberg et al. |
| 3,540,091 A | 11/1970 | Marosy |
| 3,675,499 A | 7/1972 | Marosy |
| 3,860,277 A * | 1/1975 | Wang ................ E05B 47/0002 292/201 |
| 4,027,361 A | 6/1977 | Yoneya |
| 4,136,422 A | 1/1979 | Ivanov et al. |
| 4,184,234 A | 1/1980 | Anthony et al. |
| 4,382,320 A * | 5/1983 | Yamamura .......... A44B 11/2511 24/633 |
| 4,419,874 A | 12/1983 | Brentini et al. |
| 4,468,843 A * | 9/1984 | Duclos ................ A44B 11/2534 24/635 |
| 4,487,588 A | 12/1984 | Lewis, III et al. |
| 4,504,167 A * | 3/1985 | Nakanishi ................ A63H 3/46 292/DIG. 72 |
| 4,525,901 A | 7/1985 | Krauss |
| 4,542,563 A | 9/1985 | Befort |
| 4,597,599 A * | 7/1986 | Bisbing ................ E05B 15/025 292/174 |
| 4,606,577 A | 8/1986 | Hirama et al. |
| 4,611,369 A * | 9/1986 | Wier ................ A44B 11/2523 24/635 |
| 4,616,863 A * | 10/1986 | Bryant ................ E05B 65/1033 292/168 |
| 4,660,889 A | 4/1987 | Anthony et al. |
| 4,677,715 A * | 7/1987 | Escaravage ......... A44B 11/2511 24/633 |
| 4,685,177 A | 8/1987 | Escaravage |
| 4,721,338 A | 1/1988 | Kondo |
| 4,876,770 A | 10/1989 | Bougher |
| 4,919,484 A | 4/1990 | Bougher et al. |
| 4,925,221 A | 5/1990 | Carmody et al. |
| 5,005,266 A | 4/1991 | Fister et al. |
| 5,005,267 A | 4/1991 | Sugimoto |
| 5,031,962 A | 7/1991 | Lee |
| 5,377,386 A | 1/1995 | Griffith |
| 5,430,914 A | 7/1995 | Patterson et al. |
| 5,466,044 A | 11/1995 | Barley et al. |
| 5,471,714 A | 12/1995 | Olson |
| 5,487,588 A | 1/1996 | Burleigh et al. |
| 5,524,965 A | 6/1996 | Barley |
| 5,568,676 A | 10/1996 | Freeman |
| 5,669,663 A | 9/1997 | Feuerherdt |
| 5,695,243 A | 12/1997 | Anthony et al. |
| 5,704,099 A * | 1/1998 | Cahill ................ A44B 11/2523 24/633 |
| 5,774,947 A | 7/1998 | Anscher |
| 5,779,319 A | 7/1998 | Merrick |
| 5,816,651 A | 10/1998 | Feuerherdt |
| 5,890,762 A | 4/1999 | Yoshida |
| 5,915,630 A | 6/1999 | Step |
| 5,918,934 A | 7/1999 | Siegrist |
| 5,941,601 A | 8/1999 | Scott et al. |
| 5,979,982 A | 11/1999 | Nakagawa |
| 5,997,056 A * | 12/1999 | Yamagishi ............ E05C 19/022 292/341.17 |
| 6,017,087 A | 1/2000 | Anthony et al. |
| 6,030,046 A | 2/2000 | Dorow |
| 6,082,819 A | 7/2000 | Jackson |
| 6,183,044 B1 | 2/2001 | Koyanagi et al. |
| 6,193,310 B1 | 2/2001 | Batalaris et al. |
| 6,205,629 B1 * | 3/2001 | Becker ................ A44B 11/2523 24/303 |
| 6,209,957 B1 | 4/2001 | Baloga et al. |
| 6,234,572 B1 | 5/2001 | Shiino et al. |
| 6,276,754 B1 | 8/2001 | Youssef-Agha et al. |
| 6,370,742 B1 * | 4/2002 | Yamaguchi ........ A44B 11/2523 24/633 |
| 6,400,145 B1 | 6/2002 | Chamings et al. |
| 6,419,199 B1 | 7/2002 | Skofljanec et al. |
| 6,425,632 B1 | 7/2002 | Anthony et al. |
| 6,487,761 B2 * | 12/2002 | Van Tassel .......... A44B 11/266 24/606 |
| 6,494,535 B2 | 12/2002 | Galbreath |
| 6,510,593 B1 | 1/2003 | Kim |
| 6,566,869 B2 | 5/2003 | Chamings et al. |
| 6,669,288 B2 | 12/2003 | Nakagawa et al. |
| 6,796,610 B2 | 9/2004 | Nakagawa et al. |
| 6,817,637 B1 * | 11/2004 | Anderson ............ E05B 15/022 292/150 |
| 6,820,310 B2 | 11/2004 | Woodward et al. |
| 6,948,219 B2 | 9/2005 | Kakuda et al. |
| 6,962,394 B2 | 11/2005 | Anthony et al. |
| 7,073,233 B2 | 7/2006 | Leva et al. |
| 7,124,480 B2 * | 10/2006 | Kawai ................ A44B 11/2523 24/633 |
| 7,152,926 B2 | 12/2006 | Wrobel |
| 7,246,854 B2 | 7/2007 | Dingman et al. |
| 7,278,684 B2 | 10/2007 | Boyle |
| 7,353,572 B2 | 4/2008 | Claus et al. |
| 7,543,363 B2 * | 6/2009 | Webber ................ A44B 11/2523 24/633 |
| D610,036 S | 2/2010 | Balensiefer, II |
| 7,810,220 B2 | 10/2010 | Anthony et al. |
| 7,828,180 B2 * | 11/2010 | Slesar ...................... A45F 5/02 119/776 |
| 7,862,124 B2 | 1/2011 | Dingman |
| 7,984,936 B2 * | 7/2011 | Lee ...................... G06F 1/1616 292/150 |
| 2003/0197415 A1 | 10/2003 | Dingman |
| 2004/0007909 A1 | 1/2004 | Bonk |
| 2004/0195900 A1 | 10/2004 | The et al. |
| 2004/0208692 A1 | 10/2004 | Anthony et al. |
| 2006/0186675 A1 | 8/2006 | Suzumura et al. |
| 2006/0226659 A1 * | 10/2006 | Kraus ................ E05B 1/0046 292/2 |
| 2006/0250013 A1 | 11/2006 | Shao |
| 2007/0067970 A1 | 3/2007 | Claus et al. |
| 2009/0241305 A1 | 10/2009 | Buckingham |
| 2009/0243310 A1 | 10/2009 | Buckingham et al. |
| 2009/0250946 A1 | 10/2009 | Buckingham et al. |
| 2010/0013282 A1 | 1/2010 | Balensiefer |

(56) References Cited

U.S. PATENT DOCUMENTS

| | | | | |
|---|---|---|---|---|
| 2010/0237637 A1* | 9/2010 | Camp | ................... | E05B 1/0038 |
| | | | | 292/358 |
| 2010/0247230 A1 | 9/2010 | Buckingham et al. | | |
| 2011/0101712 A1* | 5/2011 | LaConte | ............. | E05B 17/0041 |
| | | | | 292/252 |
| 2011/0116862 A1* | 5/2011 | Lo et al. | ............. | E05B 73/0082 |
| | | | | 403/326 |
| 2011/0243653 A1* | 10/2011 | Buckingham | ........ | B60N 2/2806 |
| | | | | 403/322.4 |
| 2012/0032431 A1* | 2/2012 | King | ...................... | B60J 5/0487 |
| | | | | 280/756 |
| 2012/0174353 A1* | 7/2012 | Lee | ................... | A44B 11/2523 |
| | | | | 24/593.1 |
| 2013/0307280 A1* | 11/2013 | Camp | ................... | E05B 1/0038 |
| | | | | 292/228 |
| 2015/0021955 A1* | 1/2015 | Szewczyk | ............... | B60R 21/06 |
| | | | | 296/190.03 |

FOREIGN PATENT DOCUMENTS

| | | | | | |
|---|---|---|---|---|---|
| DE | 2803851 | B1 | * | 3/1979 | ......... A44B 11/2523 |
| DE | 3006972 | A1 | * | 10/1981 | ........ A44B 11/2523 |
| DE | 19510758 | A1 | * | 9/1996 | ........... E05B 65/102 |
| DE | 19848231 | A1 | | 8/1999 | |
| DE | 19946579 | A1 | | 4/2001 | |
| DE | 10218631 | C1 | * | 5/2003 | ................ B60P 7/04 |
| EP | 0560184 | A1 | | 9/1993 | |
| EP | 0566856 | A1 | | 10/1993 | |
| EP | 0619201 | A1 | | 10/1994 | |
| EP | 0619202 | A1 | | 10/1994 | |
| EP | 0646491 | A1 | | 4/1995 | |
| EP | 0703113 | A2 | | 3/1996 | |
| EP | 0714806 | A2 | | 6/1996 | |
| EP | 0811738 | A1 | * | 12/1997 | ............. E05B 47/00 |
| EP | 0841209 | A1 | | 5/1998 | |
| EP | 0952032 | A2 | | 10/1999 | |
| EP | 0970842 | A1 | | 1/2000 | |
| EP | 982182 | A1 | | 3/2000 | |
| EP | 1059194 | A1 | | 12/2000 | |
| EP | 1099602 | A1 | | 5/2001 | |
| EP | 1188621 | A2 | * | 3/2002 | ............. B60R 21/06 |
| EP | 1231100 | A1 | | 8/2002 | |
| EP | 1414680 | A1 | | 5/2004 | |
| EP | 1439977 | A2 | | 7/2004 | |
| EP | 1472949 | A1 | | 11/2004 | |
| EP | 1628525 | A2 | | 3/2006 | |
| EP | 2322382 | A1 | * | 5/2011 | ............. B60R 9/055 |
| FR | 2782483 | A1 | | 2/2000 | |
| GB | 2055952 | A | | 3/1981 | |
| GB | 2346083 | A | | 8/2000 | |
| GB | 2349813 | A | | 11/2000 | |
| GB | 2365916 | A | | 2/2002 | |
| JP | 2002012069 | A | | 1/2002 | |
| TR | 2307829 | B1 | * | 6/2013 | ............. F25D 23/02 |
| WO | WO-03010024 | A2 | | 2/2003 | |
| WO | WO-03010035 | A1 | | 2/2003 | |
| WO | WO-2004093533 | A2 | | 11/2004 | |
| WO | WO-2009009789 | A1 | | 1/2009 | |
| WO | WO-2009124084 | A1 | | 10/2009 | |
| WO | WO-2010114571 | A1 | | 10/2010 | |
| WO | WO-2010147723 | A1 | | 12/2010 | |

OTHER PUBLICATIONS

U.S. Appl. No. 60/394,099, filed Jul. 5, 2002, Woodward.
"SafeGuard Buckle Up With Confidence," IMMI, 2002, 12 pages.
"Safeguard Child Protection, Seat Attachment Systems," Brochure, IMMI, 2001, 5 pages.
"SafeGuard Child Seat Attachment Systems," IMMI, 1999, 2 pages.
Holmbergs, ISOFIX—Connectors, 1 page.
Holmbergs, Isofix Connector C2, http://www.holmbergs.se/1/1.0.1.0/47/1/ [accessed May 21, 2010], 2 pages.
International Organization for Standarization (ISO), Draft Report of the 18th meeting of WG 1 held on Nov. 10 and 11, 1997 in Orlando, Florida, 11 pages.
Sabelt Racing Seatbelts and Accessories, http://childsafety.sabelt.com/index.php/eshop/category/Sabelt-Racing-Seatbelts-and-Accessories.html?a=/1/frmCatID/290/ [accessed May 21, 2010] 3 pages.
Novarace, EU ISOFIX, http://www.novarace.com/index.php?option=com_content&task=view&id=42&Itemid=62 [accessed May 21, 2010], 1 page.
Novarace, NOVAFIX, http://www.novarace.com/index.php?option=com_content&task=view&id=43&Itemid=51 [accessed May 21, 2010], 1 page.

* cited by examiner

LATCH DEVICE AND ANCHOR WITH SWIVEL COUPLING

CROSS-REFERENCE TO RELATED APPLICATION

The present application claims priority to U.S. Provisional Application No. 61/856,640, which is incorporated herein by reference in its entirety.

TECHNICAL FIELD

The present disclosure relates generally to latch devices, and in particular to latch devices configured to swivel when connected to an anchor.

BACKGROUND

There are many types of restraint systems used in automobiles and other vehicles. One type of restraint system used with open cabin vehicles includes a safety net configured to cover an open doorway to protect an occupant within the vehicle.

One method of securing the safety net includes attaching a web or belt on one end of the safety net to an anchor (e.g., a metal bar) on the vehicle with a releasable latch. After use, an occupant can release the latch to remove the safety net from the doorway and exit the vehicle. Upon reentering the vehicle, the occupant can reattach the net so that it again covers the opening.

DETAILED DESCRIPTION

The following disclosure describes various types of latch systems, latch devices, and methods of using such devices and systems in a vehicle, such as a utility terrain vehicle (UTV) or all-terrain vehicle (ATV). Certain details are set forth in the following description and in FIGS. 1A-8B to provide a thorough understanding of various embodiments of the disclosure. Other details describing well-known structures and systems often associated with latch systems, safety nets, and related vehicle structures, however, are not set forth below to avoid unnecessarily obscuring the description of the various embodiments of the disclosure.

Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Furthermore, various embodiments of the disclosure can include structures other than those illustrated in the Figures and are expressly not limited to the structures shown in the Figures. Moreover, the various elements and features illustrated in the Figures may not be drawn to scale.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1A.

Figure 1A:
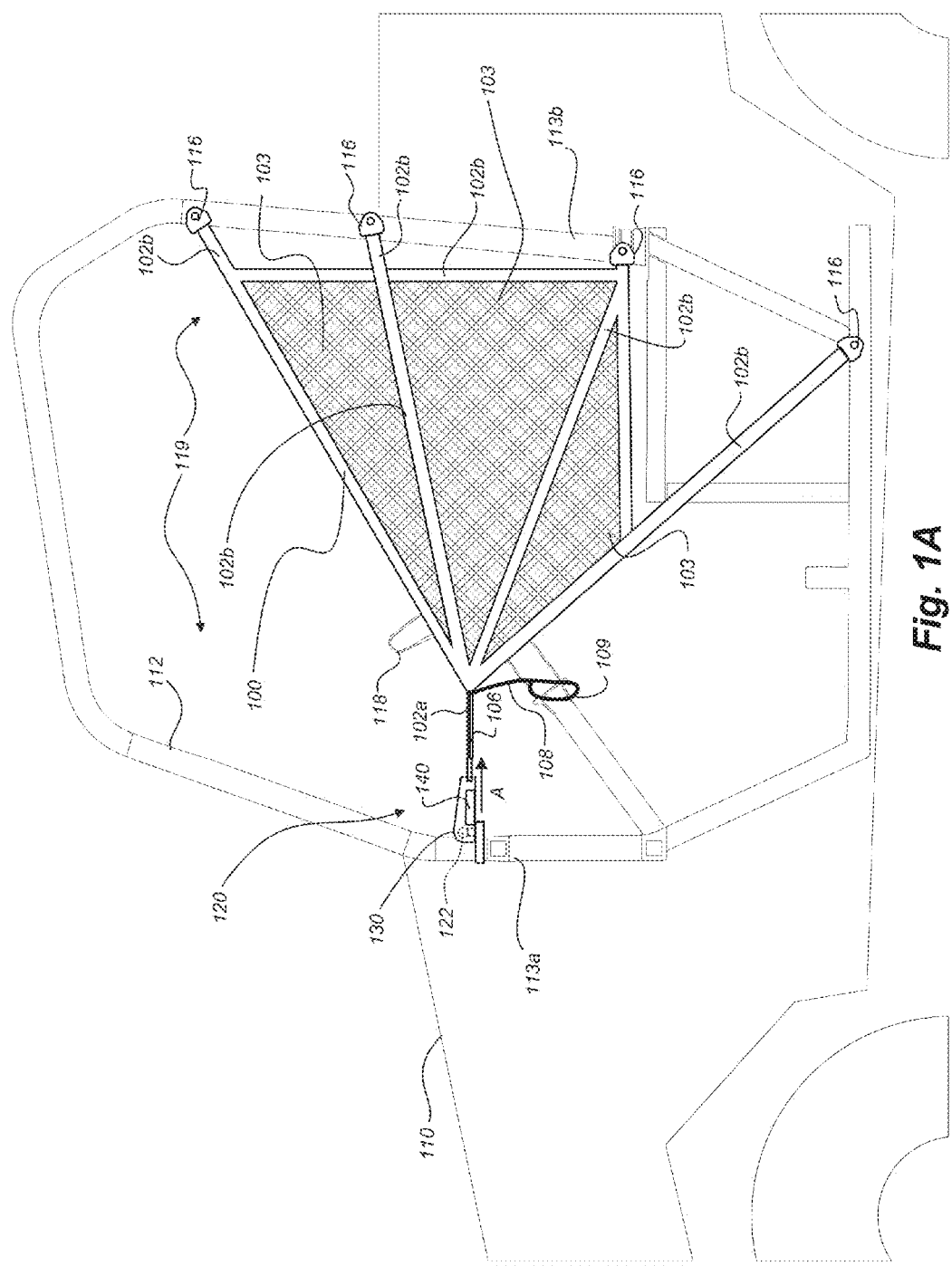
FIG. 1A is a partially-schematic side view of a safety net secured to a vehicle by a latch system configured in accordance with an embodiment of the present technology.

FIG. 1A is a partially-schematic side view of a safety net 100 secured to a vehicle 110 by a latch system 120 configured in accordance with an embodiment of the present technology. The latch system 120 is described herein with reference to various aspects of the illustrated embodiment of the safety net 100. In other embodiments, however, the latch system 120 can be employed with different restraint systems (e.g., different passenger restraint systems, cargo restraint systems, etc.). Further, while the latch system 120 of the illustrated embodiment is used with an open-cabin land vehicle, the latch system 120 can also be used in other types of vehicles (e.g., automobiles, aircraft, rotorcraft, watercraft, etc.).

The latch system 120 includes a latch device 130 connecting one end portion of the safety net 100 to a vehicle frame 112. In particular, the latch device 130 connects a first web portion or web strap 102a (e.g., a belt) of the safety net 100 to an anchor 122 (shown in hidden lines) mounted to a forward side 113a of the vehicle frame 112. The anchor 122 can be fixedly attached to the frame 112 by, e.g., a mounting bracket or other suitable attachment feature. As described in greater detail below, in the illustrated embodiment the latch device 130 includes a grip actuator 140 ("actuator 140") configured to slide in the direction of the arrow A and thereby release the latch device 130 from the anchor 122.

The safety net 100 includes second web portions or web straps 102b connected between the first web strap 102a and brackets 116 at a rearward side 113b of the vehicle frame 112. The first and second web straps 102a and 102b (collectively "web straps 102") can include, for example, polyester or nylon seatbelt webbing (e.g., three-layered threaded webbing). The safety net 100 can also include panels 103 spanning across open sections between portions of the second web straps 102b. In the illustrated embodiment, the net panels 103 include a woven mesh, such as woven strands of polypropelene, nylon, PTFE, etc. In other embodiments, however, the net panels 103 can include different materials. For example, in some embodiments an individual net panel can include a nylon sheet having openings (e.g., 1 inch diameter circular openings) cut into the nylon sheet. Moreover, although in the illustrated embodiment the web straps 102 carry three panels, in other embodiments, the web straps 102 can be configured to carry additional or fewer panels.

In the illustrated embodiment, the safety net 100 further includes a sleeve 106 attached to the first web strap 102a. The sleeve 106 slidably carries a portion of a pull cord 108, which has a first end portion operably coupled to the actuator 140 and a second end portion formed into a handle portion 109. In use, an operator (not shown) can pull the handle portion 109 and remotely operate the actuator 140 to release the latch device 130, rather than directly gripping the latch device 130 to operate the actuator 140. In one aspect of this embodiment, the handle portion 109 can be conveniently positioned toward a steering wheel 118 of the vehicle 110. Accordingly, the operator can easily reach the handle portion 109 while seated and/or restrained in the vehicle 110 by a seat belt and/or other harness. In some embodiments, however, the pull cord 108 can be omitted from the latch system 120.

In the deployed configuration shown in FIG. 1A, the safety net 100 covers a portion of an occupant opening 119 in the vehicle 110 through which an occupant can enter and exit the vehicle 110. In particular, the safety net 100 covers a region in the occupant opening 119 generally adjacent the occupant's head, torso, arms, and/or upper thighs and legs when the occupant is seated during operation the vehicle 110. In this configuration, the safety net 100 can contain and/or provide protection for the occupant within the vehicle 110. For example, the safety net 100 can prevent the occupant's body and appendages from becoming caught and pressed between the vehicle 110 and the ground or between the vehicle 110 and other objects. The safety net 100 can also keep foreign objects, such as branches, rocks, and debris from entering the vehicle 110. In other embodiments, the safety net 100 can have other configurations. For example, a system of safety nets or other suitable restrain structures can also cover a region in the occupant opening 119 toward the occupant's feet, ankles, shins, and/or knees. Other details related to safety nets and safety net systems are disclosed in, for example, U.S. Provisional Application No. 61/856,640, entitled "Self-stowing Safety Net systems for Use with Vehicles and Associated Apparatuses and Methods," and filed Jul. 19, 2013, which is incorporated by reference herein in its entirety.

Figure 1B:
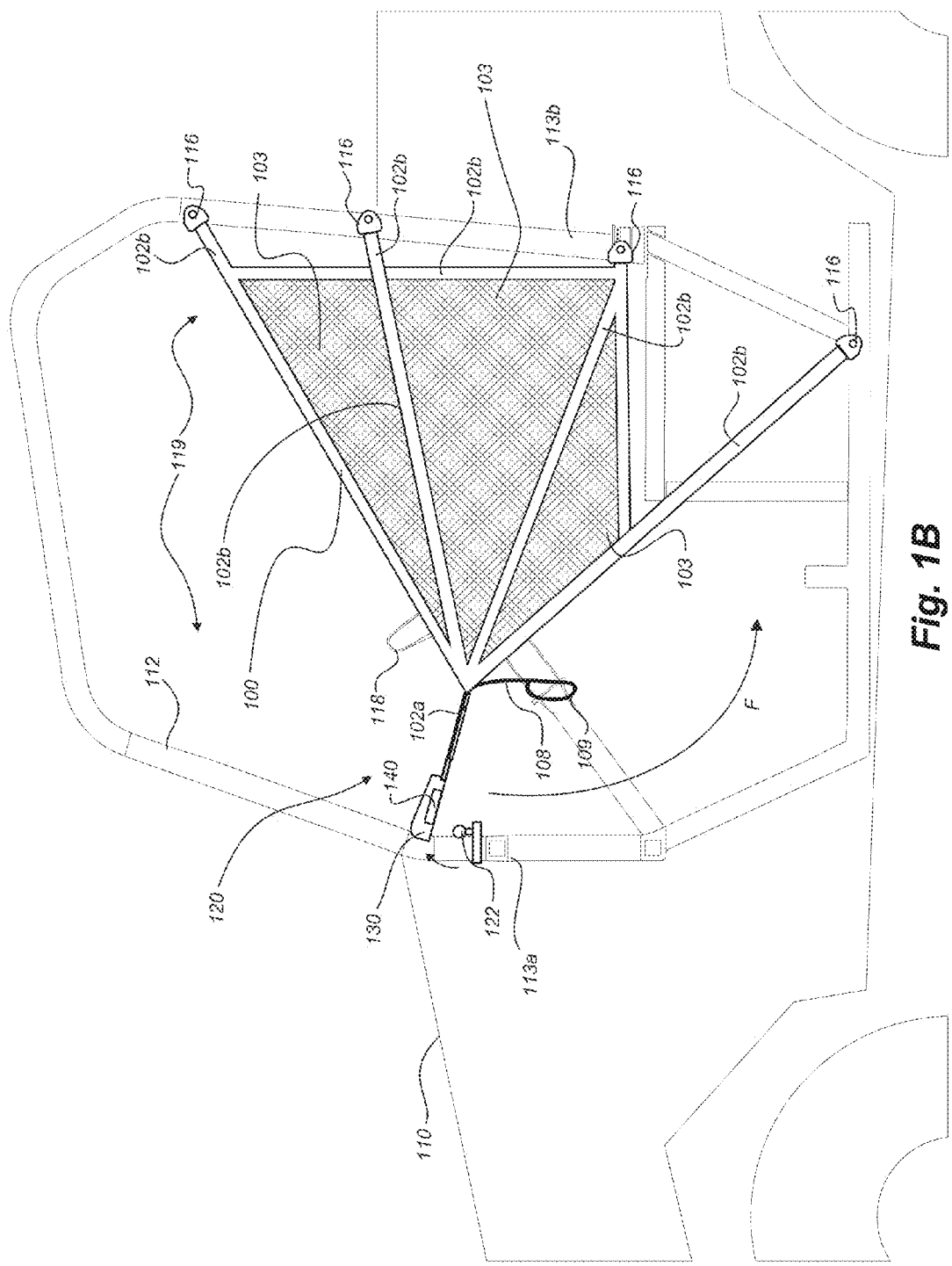
FIGS. 1B and 1C are partially-schematic side views of the latch system of FIG. 1A in various stages of retracting the safety net in accordance with an embodiment of the present technology.
Figure 1C:
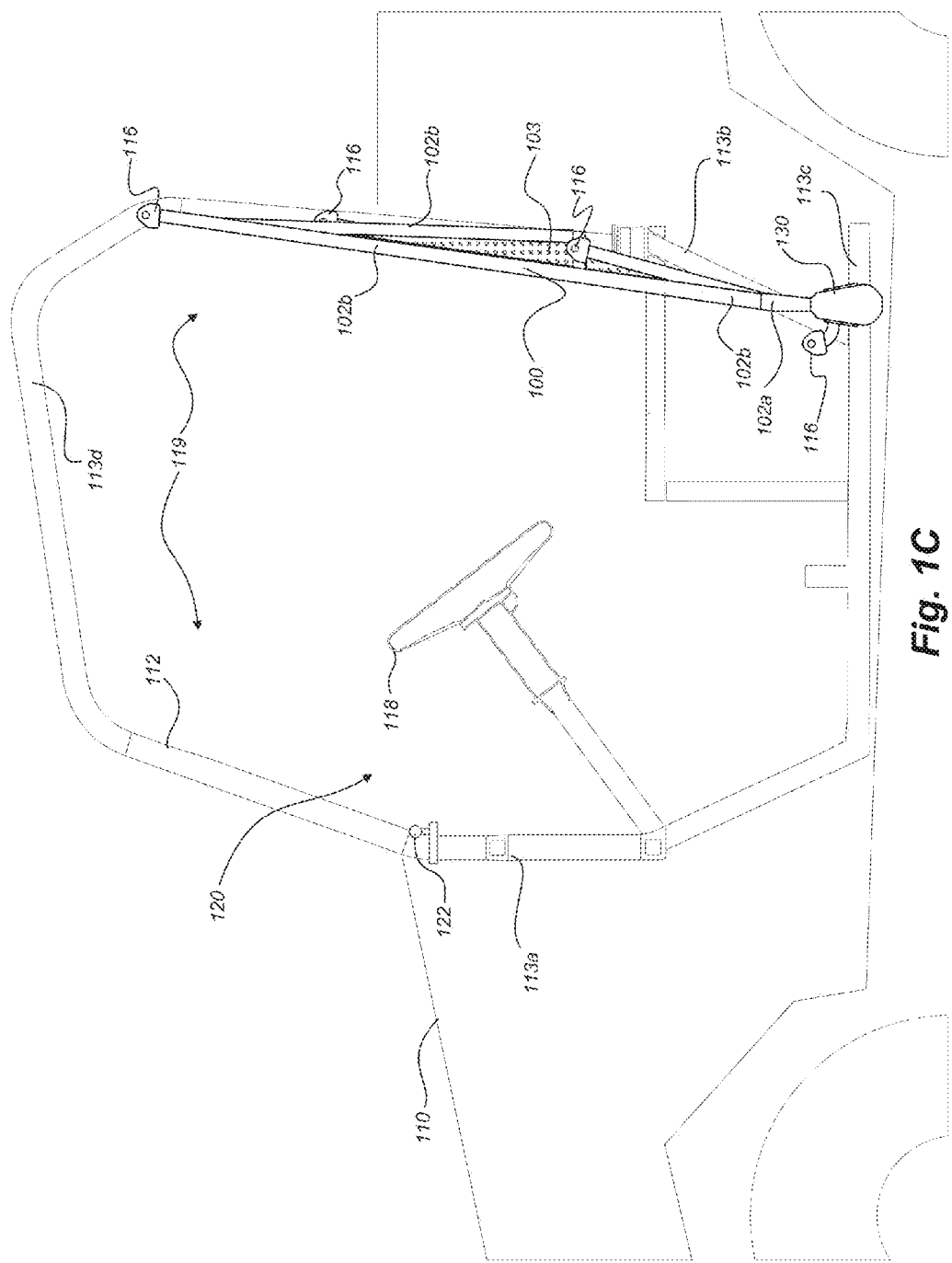

FIGS. 1B and 1C are partially-schematic side views of the latch system of 120 of FIG. 1A in various stages of releasing the safety net 100 in accordance with an embodiment of the present technology. Referring first to FIG. 1B, a user, presumably the vehicle occupant, has released the latch device 130 from the anchor 122 by manually gripping and moving the actuator 140 or by pulling the pull cord 108. As described in greater detail below, in some embodiments the latch device 130 can be configured to eject off (e.g., to "spring" or "pop" off) of the anchor 122 when it is released. In other embodiments, however, the operator can manually lift the latch device 130 off of the anchor 122. Once the latch device 130 is released, the safety net 100 can fall toward the rearward side 113b of the vehicle frame 112 in the direction of the arrow F.

Referring to FIG. 1C, the safety net 100 is collapsed or folded upon itself into a stowed configuration. In the illustrated embodiment, the latch device 130 hangs from the web straps 102 toward a bottom side 113c of the vehicle frame 112. In one aspect of this embodiment, the weight of the latch device 130 can pull the first web strap 102a in a downward direction (i.e., toward the bottom of the page). In this configuration, the latch device 130 can help prevent the safety net 100 from swinging into the occupant opening 119 and/or interfering with the vehicle occupant during vehicle operation. In other embodiments, however, the latch device 130 can attach to an anchor or other structure (not shown) to secure the first web strap 102a to, e.g., the rearward side 113b, the bottom side 113c, or a top side 113d of the vehicle frame 112 and stow the safety net 100.

Figure 2:
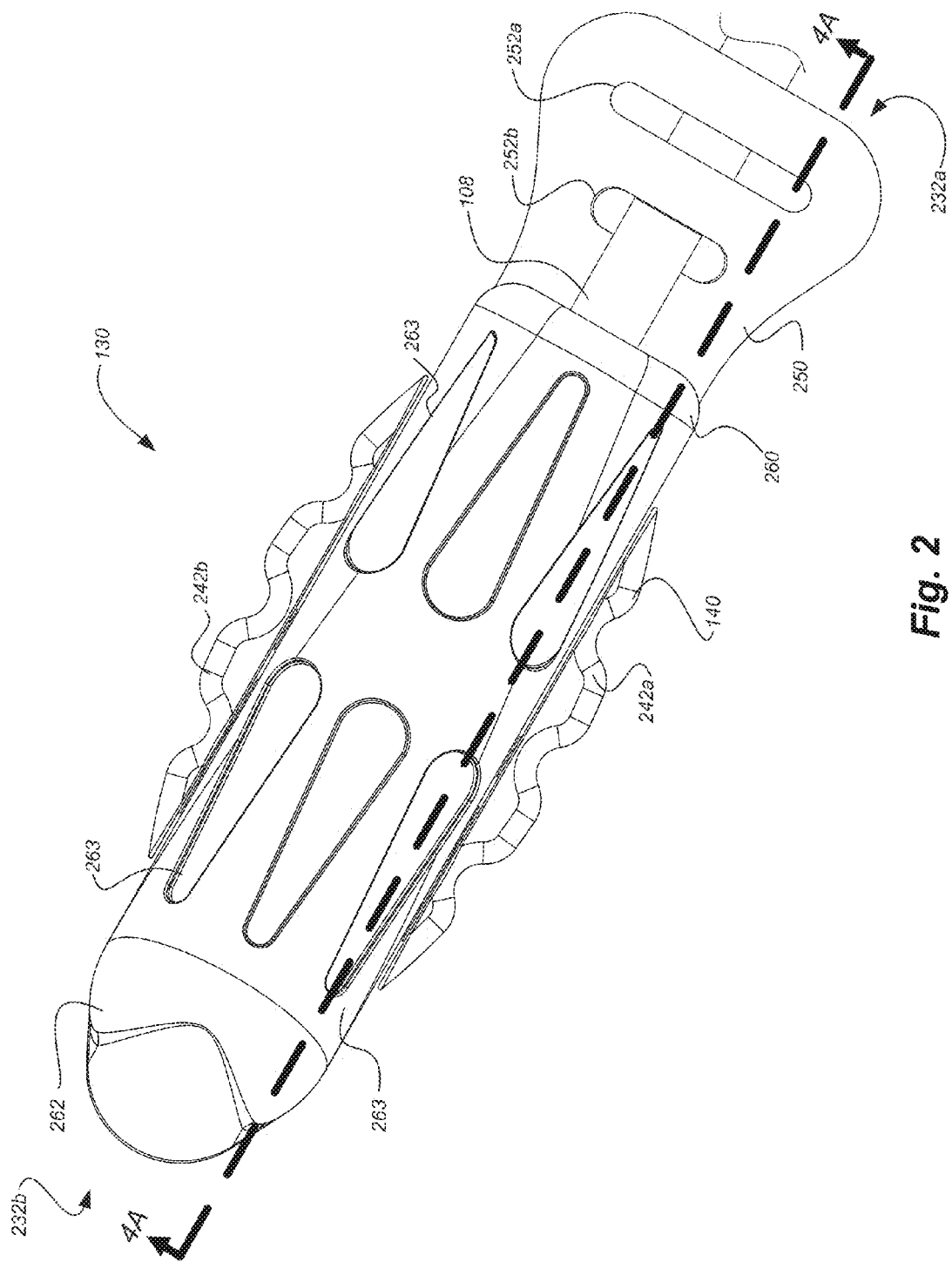
FIG. 2 is an enlarged top view of the latch device of FIG. 1A.

FIG. 2 is an enlarged top view of the latch device 130 of FIG. 1A. The latch device 130 includes a frame 250 (e.g., a metal frame) carrying a latch body or housing 260 and extending from a proximal end portion 232a to a distal end portion 232b. The frame 250 includes a first aperture or slot 252a configured to connect the frame 250 to, e.g., the first web strap 102a (FIG. 1A). For example, the first web strap 102a can be knotted, looped, connected with a fastener, or otherwise attached to the frame via the first slot 252a. The frame 250 also includes a second aperture or slot 252b arranged to slidably receive the pull cord 108 exiting from an opening (not visible in FIG. 2) in the housing 260. Within the housing 260, the pull cord 108 can be operably coupled to the actuator 140 by, e.g., a fastener, a knot, loop, etc. (not shown).

The housing 260 has an outer surface 262 and depressions 263 formed therein to enhance tactility and operator grip with the latch device 130. In the illustrated embodiment, the housing 260 is curved about its longitudinal axis and terminates in a quarter-dome shape toward the distal end portion 232b. In general, this shape is configured to support an operator's palm resting on the outer surface 262 and to conveniently position the operator's thumb and/or fingers toward the actuator 140. The actuator 140 can include raised grip features 242 (identified individually as first and second raised grip features 242a and 242b) at opposite sides of the housing 260 and that are configured to further enhance tactility and operator grip. In other embodiments, however, the actuator 140 and/or the housing 260 can have other shapes, sizes, and/or configurations to facilitate operation of the latch device 130.

Figure 3:
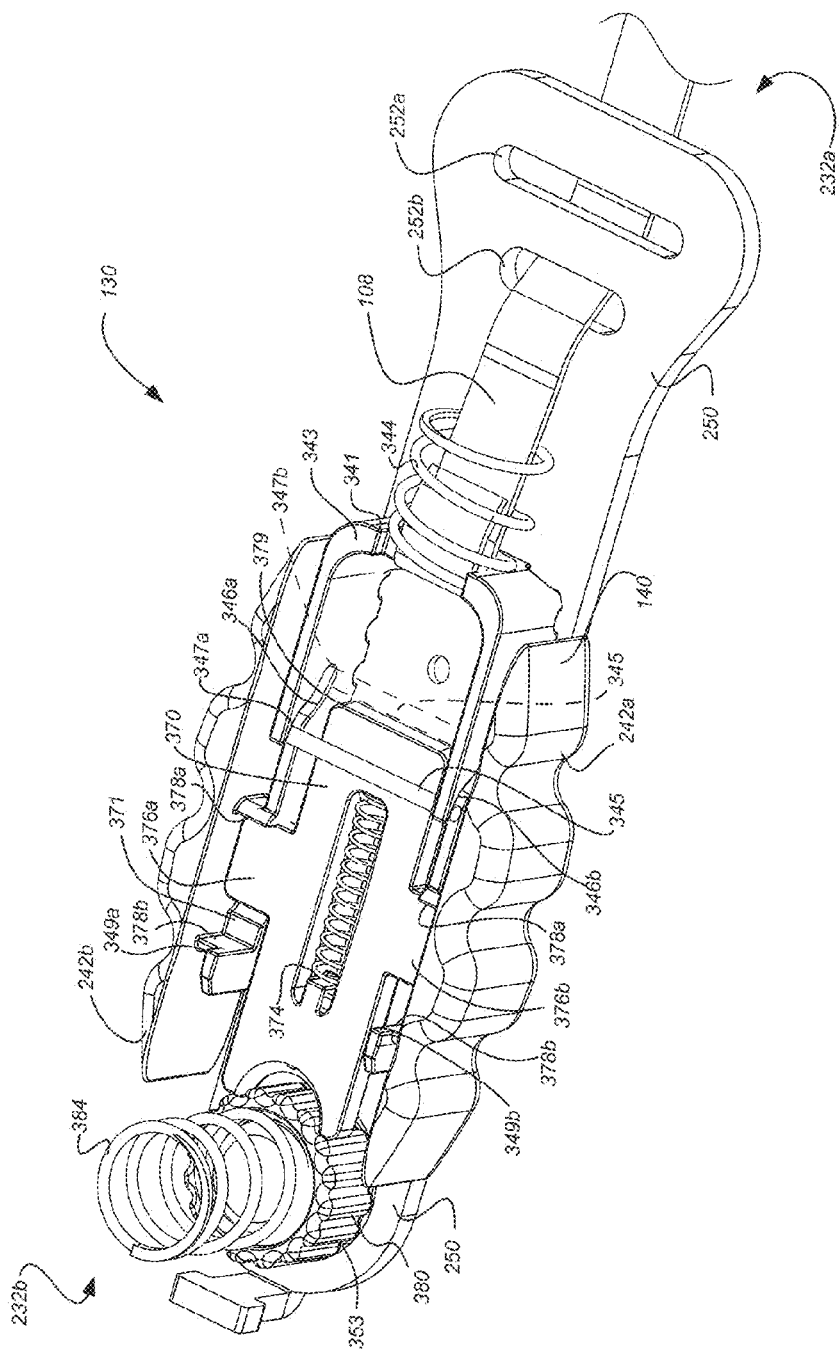
FIG. 3 is an enlarged top view of the latch device of FIG. 1A with the housing of the latch device removed.

FIG. 3 is an enlarged top isometric view of the latch device 130 of FIG. 1A with the housing 260 (FIG. 2) removed for purposes of illustration. In the illustrated embodiment, the actuator 140 carries a first engagement member 370 (e.g., a steel tongue or plate) positioned adjacent to a second engagement member 380 (e.g., a plastic or metal cap) and in sliding contact with the frame 250. The first and second engagement members 370 and 380 are biased toward an anchor aperture 353 in the frame 250 by first and second biasing members 374 and 384 (e.g., compression springs), respectively. The first engagement member 370 includes lateral tabs 376 (identified individually as first and second tabs 376a and 376b) configured to slide within guide structures 349 (identified individually as first and second guide structures 349a and 349b) of the actuator 140. The guide structures 349 each include a slide surface 371 disposed between a first wall 378a and a second wall 378b. The first and second walls 378a and 378b are configured to abut against the tabs 376 and limit back and forth movement of the first engagement member 370.

The actuator 140 includes an actuator body 343 having a first end portion 341 coupled to a third biasing member 344. The actuator body 343 includes lock features or guide channels 346 (identified individually as first and second guide channels 346a and 346b) that receive opposite end portions of a guide pin 345 (e.g., an elongate metal pin or rod). The guide pin 345 is configured to slide in the guide channels 346 from an unlocked position 347a into a locked position 347b located at a proximal end of each of the guide channels 346. The guide pin 345 is also configured to contact a second end portion 379 of the first engagement member 370 when the guide pin 345 is in the locked position 347b.

In some embodiments, the actuator 140 can be formed from plastics (e.g., ejection-molded plastics), composites, and/or other suitable non-metallic materials. In other embodiments, however, the actuator 140 can be formed from suitable metallic materials, such as cast metals. In one embodiment, for example, the grip features 242 and the actuator body 343 can be plastic members and the guide structures 349 can be metallic members that connect the grip features 242 to the actuator body 343.

Figure 4A:
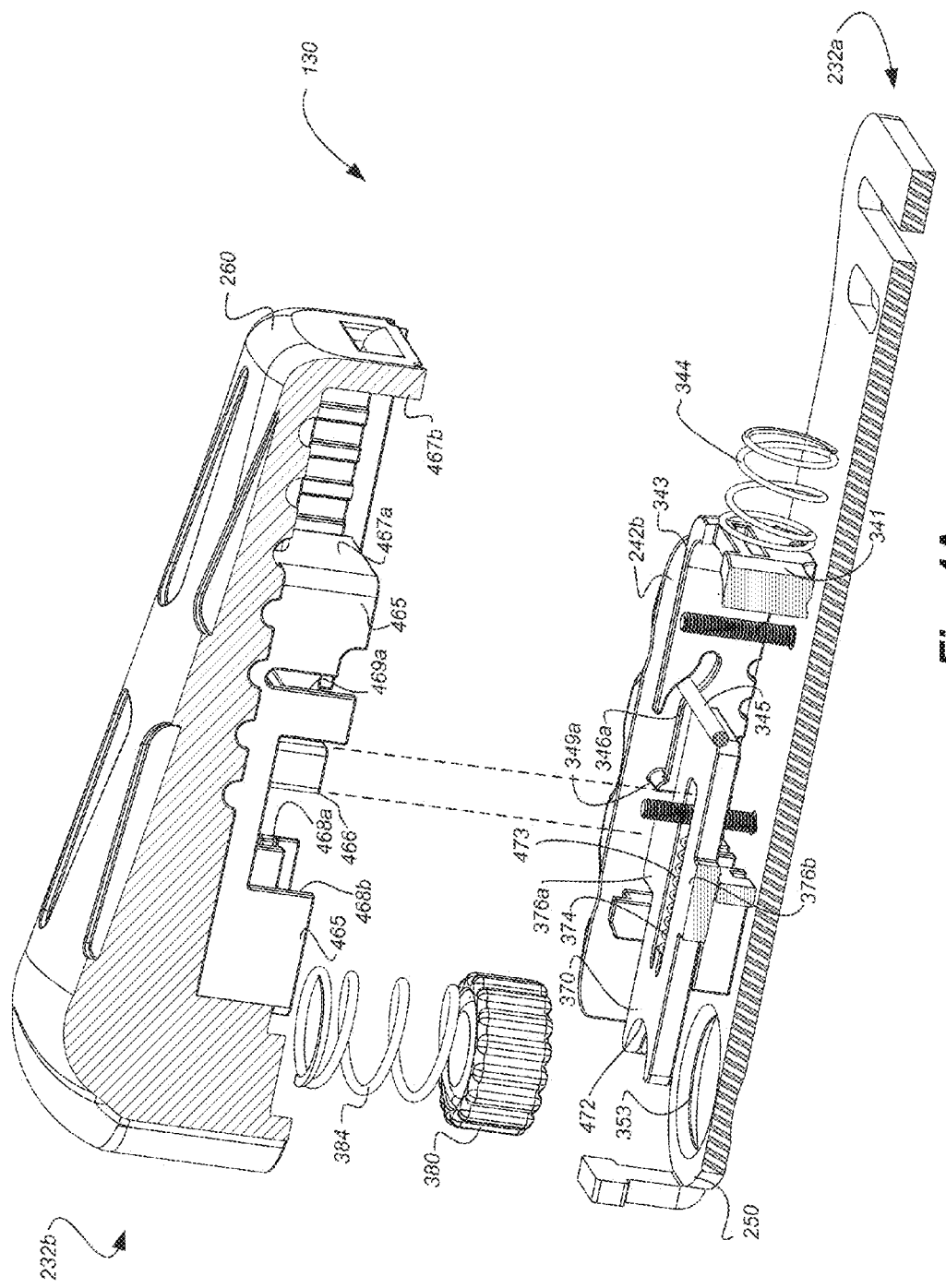
FIG. 4A is a partially-exploded, top isometric cross-sectional view of the latch device taken along the line 4A-4A in FIG. 2, and showing certain features of a first engagement member of the latch device in more detail.

FIG. 4A is a partially-exploded, top isometric cross-sectional view of the latch device 130 taken along the line 4A-4A in FIG. 2, showing certain features of the first engagement member 370 in more detail. For example, the first engagement member 370 includes a collar portion 472 movably disposed proximate the anchor aperture 353, and a retention slot 473 surrounding the first biasing member 374. A post 466 of the housing 260 extends through the retention slot 473, and the first biasing member 374 is compressed between the post 466 and the first engagement member 370. In this configuration, the first biasing member 374 presses against the post 466 and biases the first engagement member 370 toward the anchor aperture 353.

According to one aspect of the illustrated embodiment, an interior wall structure 465 of the housing 260 extends downwardly into an interior portion of the actuator body 343 and partially surrounds the first engagement member 370. The interior wall structure 465 includes a first cut-out section 468a and a second cut-out section 468b that slidably receive the first tabs 376a and the second tabs 376b, respectively, of the first engagement member 370. The interior wall structure 465 also includes a first abutment feature 467a facing a second abutment feature 467b in the housing 260. The third biasing member 344 is compressed between the first and second abutment features 467a and 467b to bias the actuator body 343 toward the distal end portion 232b of the housing 260.

Figure 4B:
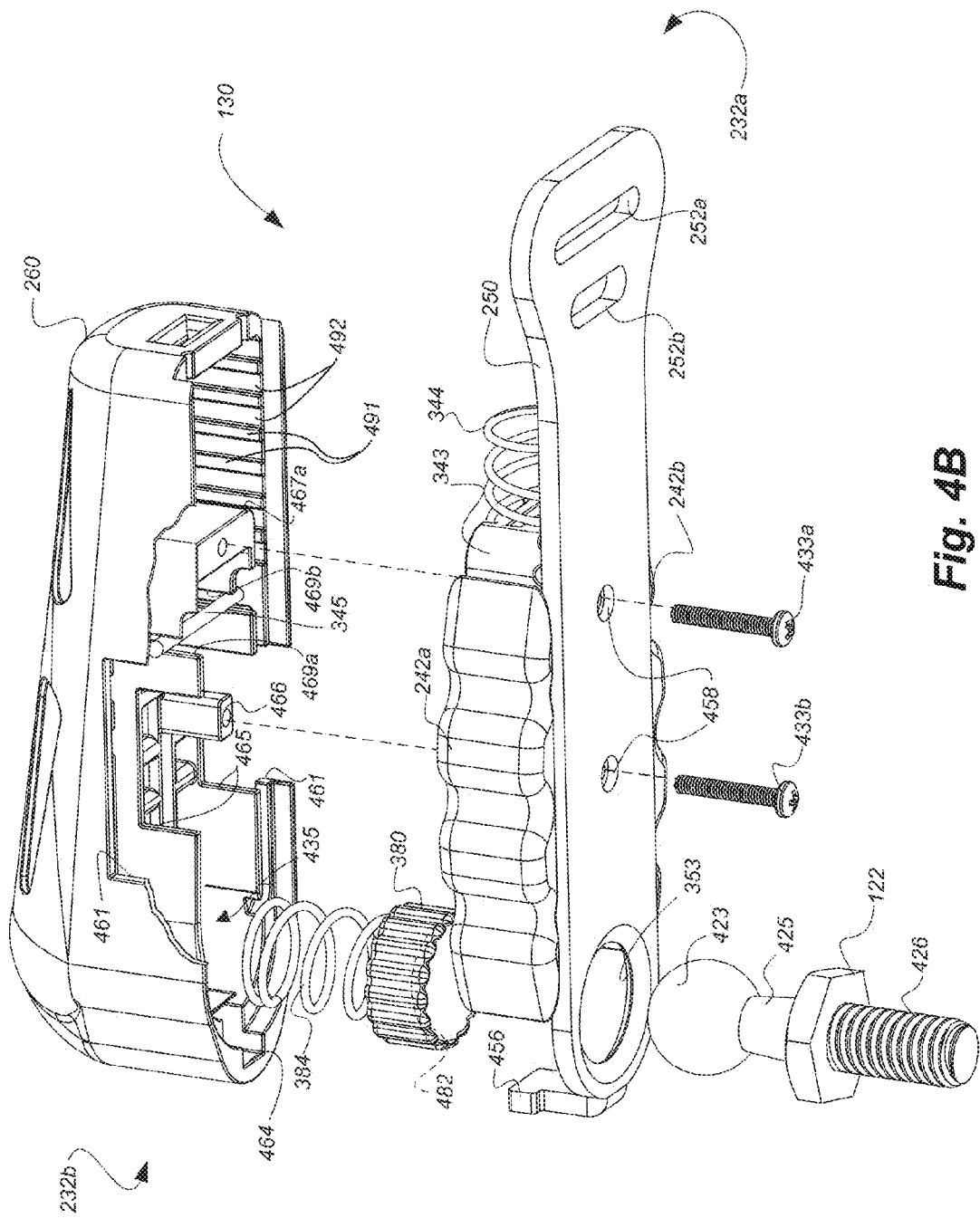
FIG. 4B is an enlarged, partially-exploded isometric bottom view of the latch device of FIG. 1A showing certain features of a second engagement member of the latch device in more detail.

The interior wall structure 465 further includes a first guide slot 469a and a second guide slot 469b (FIG. 4B; collectively "guide slots 469"). The guide slots 469 are configured to slidably receive the guide pin 345. As described in greater detail below, the guide pin 345 can slide upwardly and downwardly within the guide slots 469 and back and forth with the guide channels 346 as the actuator body 343 moves back and forth relative to the frame 250.

As further shown in FIG. 4A, the housing 260 can include surface features 491 (e.g., ridges) separating depressions 492 in the interior walls of the housing 260. The surface features 491 and the depressions 492 can keep particulates (e.g., sand, dirt, etc.) and/or other environmental debris away from the moving components of the latch device 130 to prevent fouling. For example, as the actuator 144 slides back and forth during use, it can move debris into individual depressions 463 proximate to the actuator 144. Over time, the particulates can eventually shake free from the depressions 492 during use of the latch 130. In another embodiment, the interior walls of the housing 260 toward the distal end portion 232b (not visible) can include similar features that prevent fouling of the first and/or second engagement features 370 and 380.

FIG. 4B is an enlarged, partially-exploded isometric bottom view of the latch device 130 illustrating certain features of the second engagement member 380 in more detail. The second engagement member 380 is movably disposed within an anchor cavity 435 of the housing 260. The second biasing member 384 is compressed between an interior portion of the housing 260 (not shown) and the second engagement member 380 to bias the second engagement member 380 downwardly toward the anchor aperture 353. The second engagement member 380 includes a contact surface 482 (e.g., a recessed surface) configured to receive a head portion 423 of the anchor 122 through the anchor aperture 353. In the illustrated embodiment, the head portion 423 is spherical or ball-shaped and the contact surface 482 is hemispherical and concave to accommodate the contours of the head portion 423. In one aspect of this embodiment described in greater detail below, the latch device 130 can swivel when engaged with the anchor 122 via swivel contact between the contact surface 482 and the head portion 423. In other embodiments, the head portion 423 and the contact surface 482 can have other configurations that allow the latch device 130 to swivel. For example, in an alternative embodiment the head portion 423 can be concave and the contact surface 482 can be convex. In another embodiment, the head portion 423 can be conical. For example, the head portion 423 can be an inverted and truncated cone.

The head portion 423 has a diameter configured to pass through the anchor aperture 353. For example, in some embodiments, the head portion 423 can have a diameter in the range of 10 to 20 mm (e.g., 16 mm). In the illustrated embodiment, a neck portion 425 extends between the head portion 423 and a threaded base member 426. In this embodiment, the anchor 122 can be attached to the vehicle frame 112 (FIG. 1A) by a nut or similar feature that threadably engages the base member 426.

According to another aspect of the illustrated embodiment, the housing 260 receives a flange 456 of the frame 250 into an indentation 464 in the housing 260 to secure the distal end portion 232b of the housing 260 to the frame 250. The housing is also secured to the frame 350 by first and second fasteners 433a and 433b (e.g., screws, bolts, rivets, etc.) that extend through holes 458 in a medial portion of the frame 250 and threadably engage sockets in the first abutment feature 467a and the post 466. The housing 260 further includes exterior cut-out sections 461 configured to receive the guide structures 349 (FIG. 3) of the actuator 140. More specifically, the guide structures 349 extend through the exterior cut-out sections 461 and position the grip features 242 at opposite sides of the housing 260.

According to yet another aspect of the illustrated embodiment, the interior wall structure 465 is integrally formed with the housing 260. In other embodiments, however, interior wall structure 465 can be a separate component that is attached (e.g., bonded) to the interior of the housing 260. Moreover, the frame 250 can be manufactured from a suitable metallic material, such as steel plate that is stamped and formed to shape. In other embodiments, other metals (e.g., other steels, aluminum, etc.) that are stamped, pressed, cast, forged, machined, and/or otherwise formed to shape using suitable methods known in the art can be used. In further embodiments, the frame 250 can be manufactured from composites and/or other suitable nonmetallic materials having suitable strength, stiffness, and/or other characteristics.

Figure 5A:
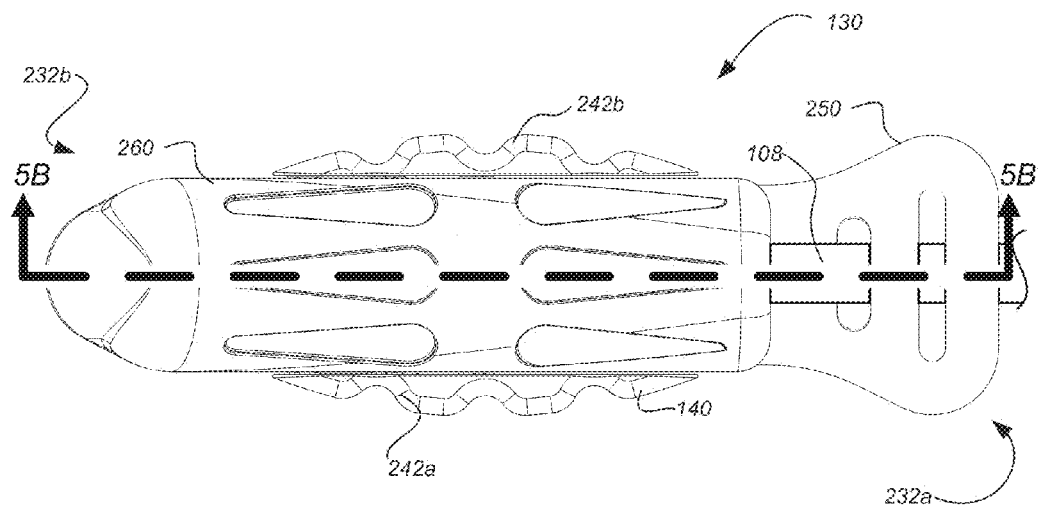
FIG. 5A is an enlarged top view of the latch device of FIG. 1A in a first stage of operation in accordance with an embodiment of the present technology.
Figure 5B:
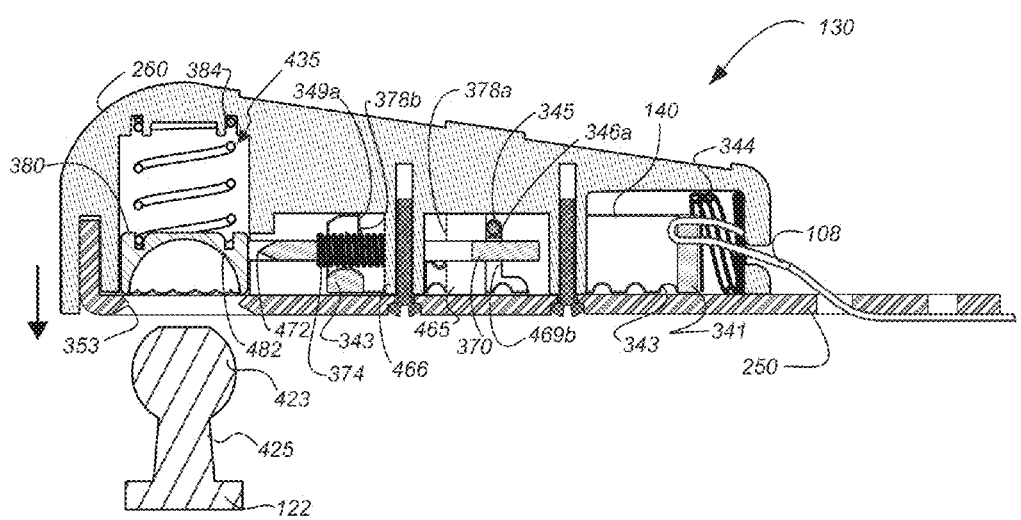
FIG. 5B is a cross-sectional side view of the latch device 130 taken along the line 5B-5B in FIG. 5A.

FIG. 5A is an enlarged top view of the latch device 130 of FIG. 1A in a first stage of operation in accordance with an embodiment of the present technology, and FIG. 5B is a cross-sectional side view of the latch device 130 taken along the line 5B-5B in FIG. 5A. Referring to FIGS. 5A and 5B together, the device 130 is disengaged from the anchor 122, and the second engagement member 380 is disposed over the anchor aperture 353. Also, the first biasing member 374 is urging the collar portion 472 of the first engagement member 370 against the second engagement member 380, and the third biasing member 344 is urging the actuator 140 forward toward the anchor cavity 435. The tabs 376 (FIG. 3) of the first engagement member 370 press against the second walls 378a of the guide structures 349 of the actuator 140 and resist the bias of the third biasing member 344.

Figure 6A:
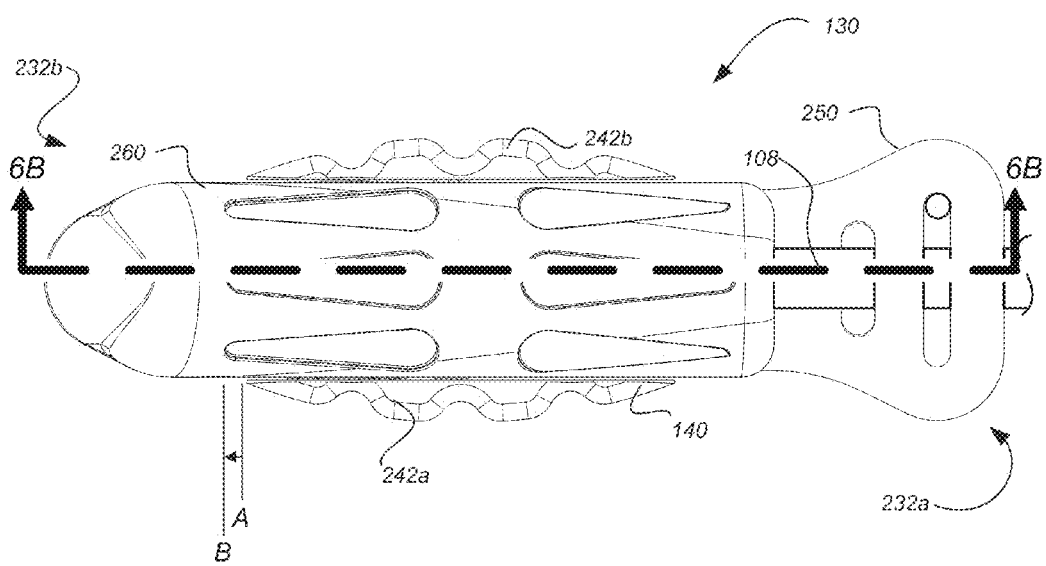
FIG. 6A is an enlarged top view of the latch device in a second stage of operation in accordance with an embodiment of the present technology.
Figure 6B:
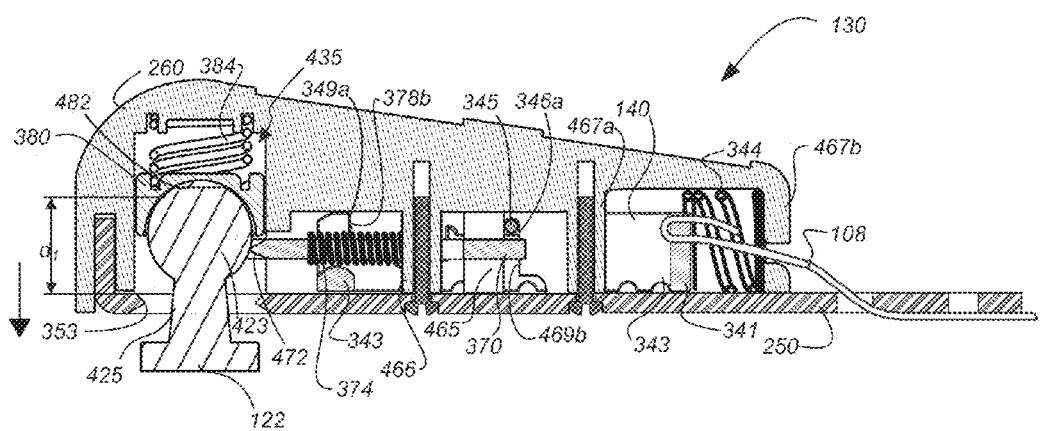
FIG. 6B is a cross-sectional side view of the latch device taken along the line 6B-6B in FIG. 6A.

FIG. 6A is an enlarged top view of the latch device 130 in a second stage of operation following the stage of FIG. 6A in accordance with an embodiment of the present technology, and FIG. 6B is a cross-sectional side view of the latch device 130 taken along the line 6B-6B in FIG. 6A. Referring to FIGS. 6A and 6B together, the operator has pushed the latch device 130 onto the anchor 120 such that the head portion 423 is inserted to a first depth $d_1$ into the anchor cavity 435. At the first depth $d_1$, the head portion 423 has moved into contact with both the collar portion 472 of the first engagement member 370 and the contact surface 482 of the second engagement member 380. As the head portion 423 moves into the anchor cavity 435, the head portion 423 pushes the second engagement member 380 above the collar portion 472 and compresses the second biasing member 384 against an interior portion of the housing 260. This enables the first biasing member 374 to move the first engagement member 370 into contact with the head portion 423. Movement of the first engagement member 370 toward the head portion 423 enables the third biasing member 344 to push the actuator 140 from position A to position B. As the actuator moves toward position B, the guide channels 346 similarly move forward and cause the guide pin 345 to move generally downward toward the locked position 347b of the guide channels 346 (FIG. 3). When the actuator 140 reaches position B, the tabs 376 (FIG. 3) of the first engagement member 370 resist further forward movement of the actuator 140.

In one aspect of this embodiment, the second engagement member 380 self-aligns the latch device 130 when the operator pushes the latch device 130 downward against the anchor 120. In particular, when the anchor 120 contacts and/or moves deeper into the anchor cavity 435, the spherical contours of the head portion 423 can push against the corresponding contours of the contact surface 482 to center the latch device 130 with the central axis of the anchor 120. Accordingly, this can enable the operator to quickly attach the latch device 130 to the anchor 120 without having to precisely align the latch device 130 with the anchor 120 when placing the latch device 130 on the anchor 120.

Figure 7A:
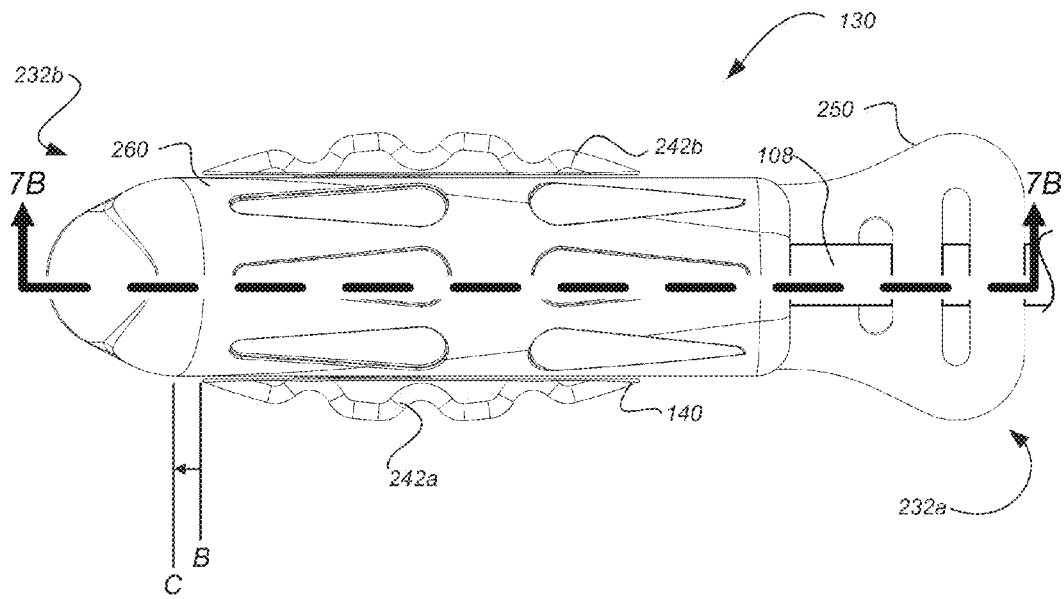
FIG. 7A is an enlarged top view of the latch device in a third stage of operation in accordance with an embodiment of the present technology.
Figure 7B:
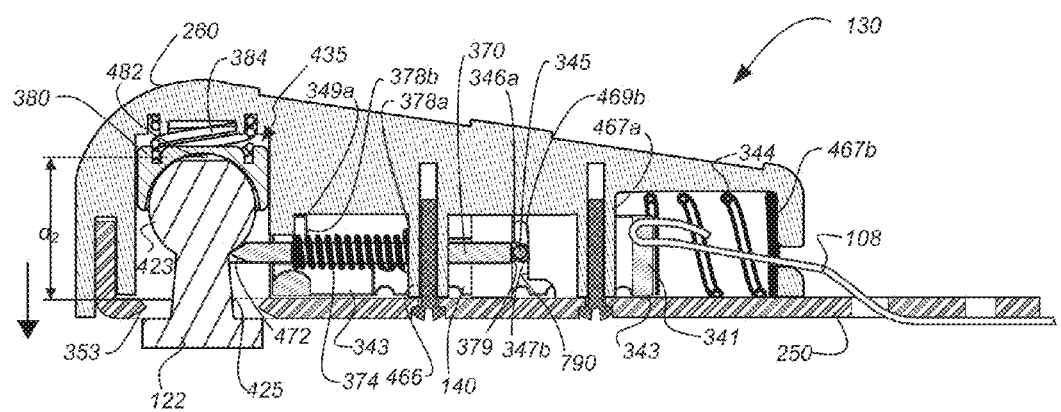
FIG. 7B is a cross-sectional side view of the latch device taken along the line 7B-7B in FIG. 7A.

FIG. 7A is an enlarged top view of the latch device 130 in a third stage of operation following the second stage of FIG. 6A in accordance with an embodiment of the present technology, and FIG. 7B is a cross-sectional side view of the latch device 130 taken along the line 7B-7B in FIG. 7A. Referring to FIGS. 7A and 7B together, at this stage the operator has pushed the latch device 130 further onto the anchor 122 and the head portion 423 extends to a second depth $d_2$ in the anchor cavity 435 greater than the first depth $d_1$. As the head portion 423 moves deeper into the anchor cavity 435, it further compress the second biasing member 384. When the head portion 423 moves above the first engagement member 370, the first biasing member 374 urges the collar portion 472 into contact with the anchor 122 proximate the neck portion 425. As the collar portion 472 moves into this position, the tabs 376 of the first engagement member 370 (FIG. 3) move further toward the anchor aperture 353. This in turn enables the third biasing member 344 to push the actuator 140 from position B to position C.

As the actuator 140 moves toward position C, the guide channels 346 move with it and allow the guide pin 345 to move further downwardly in the guide slots 469 and further toward the locked position 347b. In the locked position, the guide structures 349 trap the guide pin 345 between the second end portion 379 of the first engagement member 370 and back edges 790 of the guide slots 469 (only one of the back edges 790 is visible in FIG. 7B). As a result, the guide pin 345 restricts rearward movement of the first engagement member 370 away from the anchor aperture 353 and locks the device 130 onto the anchor 122. With the first engagement member 370 in a locked position, the second engagement member 380 pushes the head portion 423 against the first engagement member 370 under the bias of the second biasing member 384. In this configuration, the first and second engagement members 370 and 380 grasp the head portion 423 and allow the device 130 to swivel at the head portion 382, but do not allow the device 130 to pull off of the anchor 122.

In one aspect of this embodiment, the latch device 130 can "self-dock" to the anchor 120. For example, the first and second engagement members 370 and 380 can translate the downward forces that the operator applies to the anchor 120 into lateral forces that move the actuator 144 into an engaged position. Accordingly, this can enable the operator to engage the latch device 130 without having to directly operate or slide the actuator 144 rearward.

In another aspect of this embodiment, the swivel coupling of the latch device 130 helps reduce stress and/or strain on the latch device 130 and/or other parts of the safety net 100 (FIG. 1A). For example, when the latch device 130 is connected to the anchor 122, the safety net 100 may apply torsional forces to the latch device 130 when an operator and/or a foreign object pushes against the safety net 100. When the latch device 130 encounters such forces, it can swivel on the anchor 122 and thereby alleviate torque and/or other forces on the latch device 130.

Figure 8A:
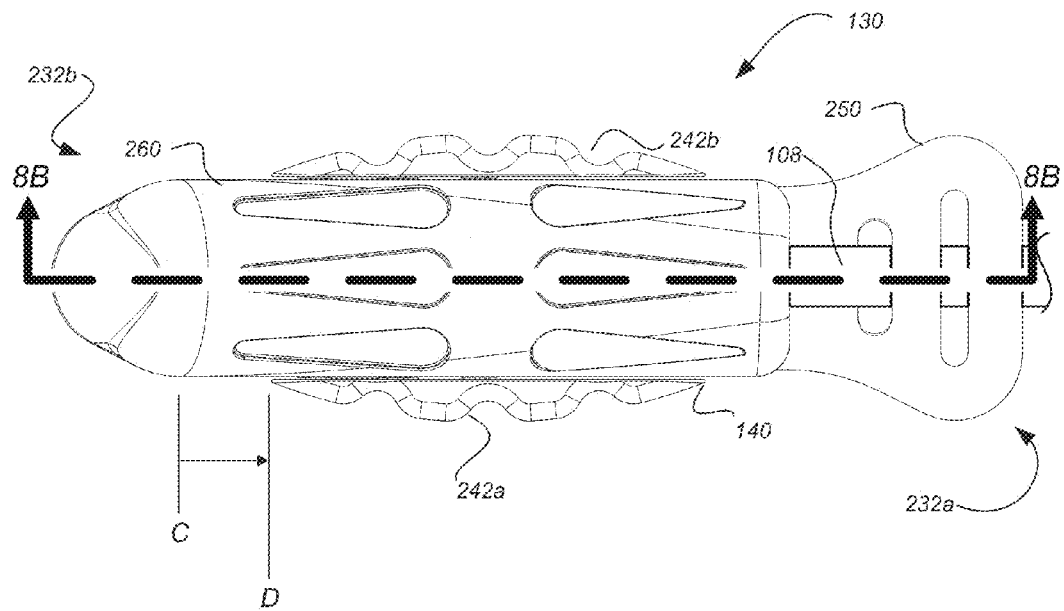
FIG. 8A is an enlarged top view of the latch device in a fourth stage of operation in accordance with an embodiment of the present technology.
Figure 8B:
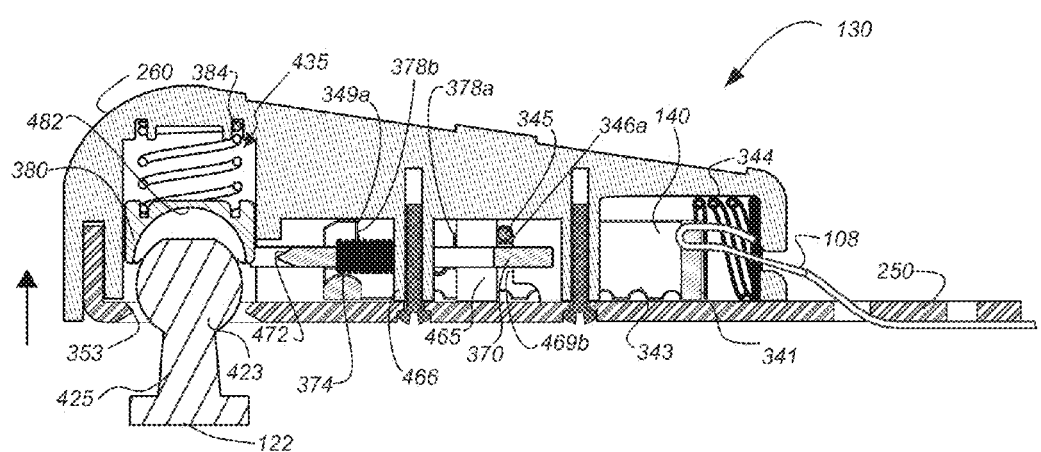
FIG. 8B is a cross-sectional side view of the latch device taken along the line 8B-8B in FIG. 8A.

FIG. 8A is an enlarged top view of the latch device 130 in a fourth stage of operation (e.g., a release stage) in accordance with an embodiment of the present technology, and FIG. 8B is a cross-sectional side view of the latch device 130 taken along the line 8B-8B in FIG. 8A. Referring to FIGS. 8A and 8B together, at this stage the operator has slid the actuator 140 from position C to position D (by manually sliding the grip features 242 or by pulling the pull cord 108) to release the first engagement member 370 from the anchor 122. When the actuator 140 moves toward position D, the guide channels 346 move in the same direction and drive the guide pin 345 generally upward and out of the locked position 347b (FIG. 3). This enables the second walls 378b of the guide structures 349 to engage the tabs 376 (of the first engagement member 370 (FIG. 3) and move the first engagement member 370 away from the anchor 122. When the first engagement member 370 is substantially withdrawn from the anchor cavity 435, the second biasing member pushes the latch device 130 off of the head portion 423 via the second engagement member 380.

In one aspect of this embodiment, the second engagement member 380 can facilitate the release of the safety net 100 (FIG. 1A) when the operator pulls the pull cord 108. For example, when the operator pulls the pull cord 108, the second engagement member 380 can urge the anchor 122 (under the bias of the second biasing member 384) through the anchor aperture 353 and partially or completely eject the latch device 130 off of the anchor 122. Accordingly, the operator can disconnect the safety net 100 without having to reach forward to manually retract the actuator 140 and lift the latch device 130 off of the anchor 122.

From the foregoing, it will be appreciated that specific embodiments of the disclosure have been described herein for purposes of illustration, but that various modifications may be made without deviating from the spirit and scope of the various embodiments of the disclosure. For example, the anchor can include different features having various sizes, shapes, and/or configurations. In some embodiments, for example, the head portion of an anchor can have a non-spherical shape in some embodiments. Moreover, the latch devices can also have different types and configurations engagement members. Further, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

We claim:

1. A latch system, comprising:
  a latch device, including—
    a frame having an anchor aperture adjacent an anchor cavity;
    a first engagement member adjacent the anchor aperture and biased toward the anchor aperture in a first direction, the first engagement member having a recessed edge portion;
    a second engagement member operably disposed in the anchor cavity and biased toward the anchor aperture in a second direction, perpendicular to the first direction, the second engagement member having a concave surface portion; and
    an actuator operably coupled to the first engagement member, wherein the actuator is biased toward the anchor aperture and against the first engagement member in the first direction; and
  an anchor having a central axis and generally spherical head portion configured to be received in the anchor cavity through the anchor aperture,
  wherein, when the head portion is inserted into the anchor cavity through the anchor aperture, the recessed edge portion or the first engagement member is movable in the first direction to contact the anchor and prevent removal of the head portion from the anchor cavity, and the concave surface portion of the second engagement member is movable in the second direction to contact the anchor and urge the head portion toward the anchor aperture, and wherein the latch device is pivotable about an axis perpendicular to the central axis of the anchor when the head portion is restrained in the anchor cavity by the first engagement member, and
  wherein the actuator is moveable in a third direction, opposite to the first direction, from a first actuator position toward a second actuator position to move the first engagement member away from the anchor and release the latch device from the anchor.

2. The latch system of claim 1 wherein the concave surface portion of the second engagement member defines a hemisphere having a first diameter, and wherein the spherical head portion of the anchor has a second diameter that is generally equivalent to, but smaller than, the first diameter.

3. The latch system of claim 2 wherein the recessed edge portion of the first engagement member includes a semicircular portion configured to contact the head portion, and wherein the concave surface portion of the second engagement member includes a hemispherical surface configured to contact the head portion.

4. The latch system of claim 1 wherein the head portion has a ball shape.

5. The latch system of claim 1:
  wherein the anchor further includes a neck portion adjacent the head portion;
  wherein the recessed edge portion of the first engagement member is movable to contact the anchor proximate a junction between the head portion and the neck portion.

6. The latch system of claim 1:
  wherein the first engagement member includes a first tab that extends outwardly from a first side of the first engagement member and a second tab that extends outwardly from a second side of the first engagement member opposite the first side;
  wherein the actuator includes a first guide structure that slidably receives the first tab and a second guide structure that slidably receives the second tab; and
  wherein the first and second tabs abut against the first and second guide structures, respectively, and restrict movement of the first engagement member when the actuator is at the first actuator position.

7. The latch system of claim 1 wherein second engagement member moves parallel to an axis of the anchor, and wherein the first engagement member moves at right angle relative to the second engagement member.

8. The latch system of claim 1:
  wherein the latch device further includes—
    a guide pin, and
    a wall structure having one or more guide slots configured to slidably receive the guide pin;
  wherein the actuator includes a first guide channel at a first side of the one or more guide slots and a second guide channel at a second side of the one or more guide slots opposite the first side, and wherein the first and second guide channels are configured to receive opposite end portions of the guide pin; and
  wherein the guide pin is configured to move within the one or more guide slots and the guide channels from an unlocked position to a locked position, wherein in the locked position, the guide pin restricts movement of the first engagement member away from the anchor aperture.

9. The latch system of claim 8 wherein the guide pin is configured to move within the one or more guide slots in a first direction that is generally perpendicular to the frame, and wherein the guide pin is further configured to move within the guide channels in a second direction that is generally transverse to the first direction.

10. The latch system of claim 1 wherein the second engagement member is configured to urge the latch device away from the anchor when the first engagement member is retracted away from the anchor.

11. The latch system of claim 1 wherein the second engagement member is configured to push the anchor through the anchor aperture and to cover the anchor aperture when the first engagement member is retracted away from the anchor.

12. The latch system of claim 1, further comprising a pull cord attached to the actuator, wherein tension applied to the pull cord by an operator moves the actuator from the first actuator position toward the second actuator position.

13. The latch system of claim 1 wherein:
the latch device further includes a housing attached to the frame;
the housing forms an enclosure that at least partially encloses the actuator and the first engagement member; and
the actuator is slidably coupled to the housing.

14. The latch system of claim 1 wherein the first engagement member is slidably coupled to the actuator, and wherein the latch device further includes:
a first biasing member carried by the first engagement member and coupled to a portion of the frame; and
a second biasing member coupled to the actuator and configured to resist a bias of the first biasing member.

15. The latch system of claim 14 wherein:
the latch device further includes a housing attached to the frame and at least partially covering the actuator;
the actuator has a first abutment feature;
the housing has a second abutment feature facing the first abutment feature; and
the second biasing member is operably disposed between the first and second abutment features.

16. A latch device, comprising:
a latch body having an anchor cavity;
a first engagement member movably disposed within the latch body, the first engagement member having a recess in a distal edge portion thereof; and
a second engagement member movably disposed within the anchor cavity, the second engagement member having a concave surface portion, wherein the first engagement member is biased toward the second engagement member,
wherein the concave surface portion of the second engagement member receives an anchor inserted into the anchor cavity through an aperture, wherein the anchor moves the second engagement member from a first anchor depth in the anchor cavity to a second anchor depth in the anchor cavity when the anchor is inserted into the anchor cavity, and wherein the second anchor depth is deeper than the first anchor depth relative to the aperture, wherein the anchor has a central axis and a spherical head portion,
wherein at the first anchor depth the distal edge portion of the first engagement member presses against the second engagement member, and
wherein at the second anchor depth—
the distal edge portion of the first engagement member presses against the anchor,
the concave surface portion of the second engagement member presses against the anchor and urges the anchor against the spherical head portion of the first engagement member, and
the first and second engagement members restrain the anchor from exiting the anchor cavity but permit rotation of the latch device about an axis perpendicular to the central axis of the anchor.

17. The latch device of claim 16, further comprising an actuator operably coupled to the first engagement member, wherein the actuator is configured to move from a first actuator position toward a second actuator position to move the first engagement member away from the anchor and release the anchor.

18. The latch device of claim 17, further comprising a biasing member disposed between the second engagement member and the latch body, wherein the biasing member is configured to push the second engagement member against the anchor and eject the latch body off of the anchor when the actuator moves from the first actuator position toward the second actuator position.

19. The latch device of claim 16 further comprising:
a first biasing member operably coupling the first engagement member to a portion of the latch body; and
a second biasing member operably disposed between the actuator and the latch body, wherein the second biasing member is configured to resist a bias of the first biasing member.

20. The latch device of claim 19 wherein:
the first engagement member includes a slot configured to receive the first biasing member;
the portion of the latch body includes a post that extends through the slot; and
the first biasing member is operably coupled to the post.

21. A personal restraint system for use with an open cabin vehicle, the vehicle having a frame adjacent to at least a portion of an opening to an operator seating portion of the vehicle, the system comprising:
an anchor configured to be mounted to the vehicle frame, the anchor having a central axis and a spherical head portion; and
a latch device having an aperture configure to receive the anchor, wherein the latch device includes—
a first engagement member biased toward the aperture in a first direction, the first engagement member having a recessed surface at a distal end portion thereof,
a release actuator biased against the first engagement member in the first direction, and
a second engagement member biased toward the aperture in a second direction, perpendicular to the first direction, the second engagement member having a concave surface,
wherein the recessed surface of the first engagement member is configured to press against the spherical head portion and prevent removal of the latch device from the anchor while permitting the latch device to rotate about an axis perpendicular to the central axis of the anchor,
wherein the concave surface of the second engagement member is configured to press the anchor against the recessed surface of the first engagement member, and
wherein the release actuator is configured to move in a third direction, opposite to the first direction, from a first actuator position toward a second actuator position to move the first engagement member away from the anchor and eject the latch device from the anchor via the second engagement member.

22. The system of claim 21 wherein the anchor is configured to be mounted to a first portion of the vehicle frame, and wherein the system further comprises a net coupled to the latch device and configured to be attached to a second portion of the vehicle frame.

23. The system of claim 22 wherein:
the latch device includes a housing having an anchor cavity adjacent the aperture, and a biasing member within the anchor cavity;

the biasing member is compressed between the second engagement member and the housing; and the second engagement member is configured to interact with the anchor when the anchor is inserted through the aperture, and to eject the latch device off of the anchor via decompression of the biasing member, thereby releasing the net.

24. The system of claim 22 wherein the net further comprises:

a sleeve; and a pull cord slidably extending through the sleeve and operably coupled to the actuator via the sleeve, wherein the pull cord is positioned to be disposed within reach of an operator seated in the operator seating portion of the vehicle.

* * * * *